United States Patent
Chiu et al.

(10) Patent No.: US 9,836,425 B2
(45) Date of Patent: *Dec. 5, 2017

(54) COMPUTER APPARATUS, DATAPATH SWITCHING APPARATUS AND ASSOCIATED METHOD FOR SWITCHING DATAPATHS FOR TRANSMITTING SENSING DATA ACCORDING TO OPERATING SYSTEM UTILIZED BY COMPUTER APPARATUS

(71) Applicant: GETAC TECHNOLOGY CORPORATION, Hsinchu County (TW)

(72) Inventors: Yi-Chia Chiu, New Taipei (TW); Chin-Jung Chang, New Taipei (TW)

(73) Assignee: Getac Technology Corporation, Hsinchu (TW)

( * ) Notice: Subject to any disclaimer, the term of this patent is extended or adjusted under 35 U.S.C. 154(b) by 582 days.

This patent is subject to a terminal disclaimer.

(21) Appl. No.: 14/324,010

(22) Filed: Jul. 3, 2014

(65) Prior Publication Data

US 2015/0052285 A1 Feb. 19, 2015

Related U.S. Application Data

(60) Provisional application No. 61/865,913, filed on Aug. 14, 2013.

(30) Foreign Application Priority Data

Feb. 28, 2014 (CN) .......................... 2014 1 0072408

(51) Int. Cl.
*G06F 13/00* (2006.01)
*G06F 13/40* (2006.01)

(52) U.S. Cl.
CPC ...... *G06F 13/4068* (2013.01); *G06F 13/4022* (2013.01)

(58) Field of Classification Search
USPC .................................. 710/316–317, 260–269
See application file for complete search history.

(56) References Cited

U.S. PATENT DOCUMENTS

| | | | | |
|---|---|---|---|---|
| 8,312,476 B2* | 11/2012 | Chin | .......................... | G06F 9/54 |
| | | | | 719/319 |
| 8,751,833 B2* | 6/2014 | Hill | ........................ | G06F 1/3203 |
| | | | | 711/130 |
| 8,868,899 B2* | 10/2014 | Galicia | ............... | G06F 9/45533 |
| | | | | 713/1 |
| 9,052,920 B2* | 6/2015 | Ting | ...................... | G06F 9/4411 |
| 9,256,563 B2* | 2/2016 | Ting | ...................... | G06F 13/385 |
| 9,367,332 B2* | 6/2016 | Wang | ...................... | G06F 9/441 |
| 9,459,141 B2* | 10/2016 | Lin | .......................... | G01K 13/00 |
| 2013/0319640 A1* | 12/2013 | Cavallaro | ................. | F28F 7/00 |
| | | | | 165/121 |

\* cited by examiner

*Primary Examiner* — Raymond Phan

(57) ABSTRACT

A computer apparatus, a datapath switching method and an associated method are provided. An operating system utilized by the computer apparatus is detected by an embedded controller, and datapaths for transmitting sensing signals to a platform controller hub are switched according to the operating system utilized by the computer apparatus by the embedded controller.

21 Claims, 3 Drawing Sheets

COMPUTER APPARATUS, DATAPATH SWITCHING APPARATUS AND ASSOCIATED METHOD FOR SWITCHING DATAPATHS FOR TRANSMITTING SENSING DATA ACCORDING TO OPERATING SYSTEM UTILIZED BY COMPUTER APPARATUS

BACKGROUND OF THE INVENTION

Field of the Invention

The present invention relates to an electronic apparatus, and more particularly, to a computer apparatus, a datapath switching apparatus and an associated method.

Description of the Prior Art

As information technologies continue progressing, many computers are capable of supporting multiple operating systems. For example, one computer may support and be installed with two operating systems namely Microsoft Windows 7 and Windows 8.

To satisfy authentication of Windows 8, a computer requires a sensor hub that consolidates data from three types of sensors—an accelerometer, a gyroscope and a magnetometer. A computer compliant with the Windows 8 architecture may communicate with the sensor hub through a platform controller hub (PCH) via a Universal Serial Bus (USB) or an Inter-Integrated Circuit (I2C) bus. However, when a computer compliant with the Windows 8 architecture operates on a Windows 7 operating system, the system of the computer cannot obtain data from the three sensors mentioned above by the sensor hub, thus the computer apparatus malfunctions.

SUMMARY OF THE INVENTION

The present invention provides a computer apparatus, a datapath switching apparatus and an associated method, which allow a computer apparatus to simultaneously comply with hardware requirements of Windows 7 and Windows 8 operating systems.

The datapath switching apparatus of the present invention is applied for switching paths for transmitting sensing data according to an operating system utilized by a computer apparatus. The datapath switching apparatus includes a sensor hub and an embedded controller. The sensor hub, coupled to a platform controller hub, receives the sensing data. The embedded controller, coupled to the sensor hub, detects the operating system utilized by the computer apparatus, and switches datapaths for transmitting the sensing data to the platform controller hub according to the operating system utilized by the computer apparatus.

In one embodiment of the present invention, the embedded controller further controls the sensor hub to transmit the sensing data to the platform controller hub via a first data transmission interface or to transmit the sensing data to the platform controller hub via a second data transmission interface and the embedded controller according to the operating system utilized by the computer apparatus.

In one embodiment of the present invention, the first data transmission interface is a Universal Serial Bus (USB), and the second data transmission interface is an Inter-Integrated Circuit (I2C) bus.

In one embodiment of the present invention, when the operating system of the computer apparatus is a Windows 8 operating system, the embedded controller controls the sensor hub to transmit the sensing data to the platform controller hub via the first transmission interface; when the operating system of the computer apparatus is a Windows 7 operating system, the embedded controller controls the sensor hub to transmit the sensing data to the platform controller hub via the second data transmission interface and the embedded controller.

In one embodiment of the present invention, the datapath switching apparatus further includes a switching unit. The switching unit, coupled to the embedded controller and the sensor hub, receives the sensing data, and is controlled by the embedded controller to transmit the sensing data to the embedded controller or the sensor hub.

In one embodiment of the present invention, when the operating system of the computer apparatus is a Windows 8 operating system, the embedded controller controls the switching unit to transmit the sensing data to the platform controller hub via the sensor hub; when the operating system of the computer apparatus is a Windows 7 operating system, the embedded controller controls the switching unit to transmit the sensing data to the platform controller hub via the embedded controller.

In one embodiment of the present invention, the sensing data includes at least one of accelerometer sensing data, gyroscope sensing data, and magnetometer sensing data.

A computer apparatus of the present invention is configured with at least one operating system, and includes a platform controller hub, a sensor hub and an embedded controller wherein the sensor hub coupled to the platform controller hub receives sensing data. The embedded controller, coupled to the sensor hub and the platform controller hub, detects an operating system utilized by the computer apparatus, and switches datapaths for transmitting the sensing data to the platform controller hub according to the operating system category.

In one embodiment of the present invention, the embedded controller further controls the sensor hub to transmit the sensing data to the platform controller hub via a first data transmission interface or to transmit the sensing data to the platform controller hub via a second data transmission interface and the embedded controller according to the operating system utilized by the computer apparatus.

In one embodiment of the present invention, the first data transmission interface is a USB bus, and the second data transmission interface is an I2C bus.

In one embodiment of the present invention, when the operating system of the computer apparatus is a Windows 8 operating system, the embedded controller controls the sensor hub to transmit the sensing data to the platform controller hub via the first data transmission interface; when the operating system of the computer apparatus is a Windows 7 operating system, the embedded controller controls the sensor hub to transmit the sensing data to the platform controller hub via the second data transmission interface and the embedded controller.

In one embodiment of the present invention, the computer apparatus further includes a switching unit. The switching unit, coupled to the embedded controller and the sensor hub, receives the sensing data, and is controlled by the embedded controller to transmit the sensing data to the embedded controller or the sensor hub.

In one embodiment of the present invention, when the operating system of the computer apparatus is a Windows 8 operating system, the embedded controller controls the switching unit to transmit the sensing data to the platform controller hub via the sensor hub; when the operating system of the computer apparatus is a Windows 7 operating system, the embedded controller controls the switching unit to transmit the sensing data to the platform controller hub via the embedded controller.

In one embodiment of the present invention, the sensing data includes at least one of accelerometer sensing data, gyroscope sensing data, and magnetometer sensing data.

A datapath switching method of the present invention is applied for switching datapaths for transmitting sensing data of a computer apparatus. The datapath switching method includes steps of: receiving sensing data; detecting an operating system utilized by the computer apparatus; switching the datapaths for transmitting the sensing data to a platform controller hub according to the operating system utilized by the computer apparatus.

In one embodiment of the present invention, the step of switching the datapaths for transmitting the sensing data to the platform controller hub according to the operating system utilized by the computer apparatus includes: controlling the sensor hub to transmit the sensing data to the platform controller hub via a first data transmission interface, or controlling the sensor hub to transmit the sensing data to the platform controller hub via a second data transmission interface and the embedded controller according to the operating system utilized by the computer apparatus.

In one embodiment of the present invention, the first data transmission interface is a USB bus, and the second data transmission interface is an I2C bus.

In one embodiment of the present invention, when the operating system of the computer apparatus is a Windows 8 operating system, the sensor hub is controlled to transmit the sensing data to the platform controller hub via the first transmission interface; when the operating system of the computer apparatus is a Windows 7 operating system, the sensor hub is controlled to transmit the sensing data to the platform controller hub via the second data transmission interface and the embedded controller.

In one embodiment of the present invention, the step of switching the datapaths for transmitting the sensing data to the platform controller hub according to the operating system utilized by the computer apparatus includes: controlling a switching unit that receives the sensing data to transmit the sensing data to the embedded controller or the sensor hub according to the operating system utilized by the computer apparatus.

In one embodiment of the present invention, when the operating system of the computer apparatus is a Windows 8 operating system, the switching unit is controlled to transmit the sensing data to the platform controller hub via the sensor hub; when the operating system of the computer apparatus is a Windows 7 operating system, the switching unit is controlled to transmit the sensing data to the platform controller hub via the embedded controller.

In one embodiment of the present invention, the sensing data includes at least one of accelerometer sensing data, gyroscope sensing data, and magnetometer sensing data.

As described above, according to embodiments of the present invention, an operating system utilized by a computer apparatus is detected by an embedded controller, and datapaths for transmitting sensing data to a platform controller hub are switched according to the operating system utilized by the computer apparatus, thereby rendering the computer apparatus to be simultaneously applicable to Windows 7 and Windows 8 operating systems.

The present invention will become more readily apparent to those ordinarily skilled in the art after reviewing the following detailed description and accompanying drawings, in which:

DETAILED DESCRIPTION OF THE EMBODIMENTS

Figure 1:
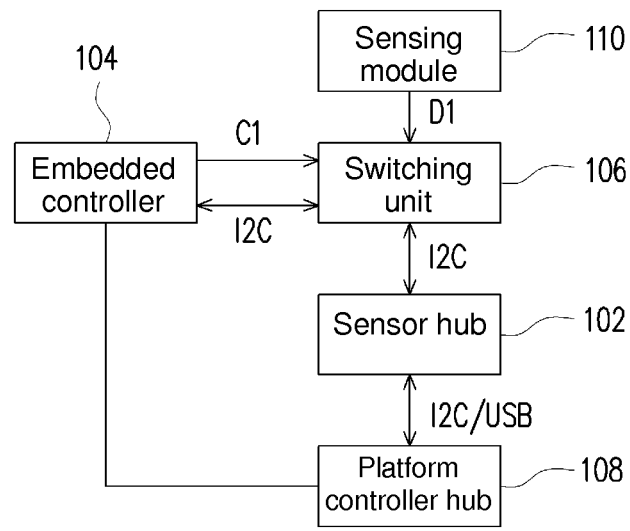
FIG. 1 is a schematic diagram of a computer apparatus according to an embodiment of the present invention.

FIG. 1 shows a schematic diagram of a computer apparatus according to an embodiment of the present invention. Referring to FIG. 1, a computer apparatus includes a sensor hub 102, an embedded controller 104, a switching unit 106, a platform controller hub 108 and a sensing module 110. The platform controller hub 108 is coupled to the sensor hub 102 and the embedded controller 104. The switching unit 106 is coupled to the sensor hub 102, the embedded controller 104 and the sensing module 110. For example, the sensing module 110 may be a sensor such as an accelerometer, a gyroscope or a magnetometer but it is not limited thereto. The sensing module 110 can even generate sensing data D1. For example, the sensor hub 102 and the embedded controller 104 receive the sensing data D1 via an Inter-Integrated Circuit (I2C) bus. The embedded controller 104 may detect an operating system category that the computer apparatus utilizes, e.g., a Windows 7 or Windows 8 operating system, and switches a datapath for transmitting the sensing data D1 to the platform controller hub 108 according to the operating system utilized by the computer apparatus.

More specifically, when the computer apparatus is powered on, the embedded controller 104 detects the operating system utilized by the computer apparatus through a basic input/output system (BIOS). Upon detecting that the operating system utilized by the computer apparatus is a first operating system, e.g., a Windows 8 operating system, the embedded controller 104 controls the switching unit 106 to transmit the sensing data D1 to the platform controller hub 108 via the sensor hub 102. That is, the embedded controller 104 controls the switching unit 106 to first transmit the sensing data D1 to the sensor hub 102, which then transmits the sensing data D1 to the platform controller hub 108, wherein a transmission interface between the sensor hub 102 and the platform controller hub 108 for example may be an I2C or USB bus. On the other hand, upon detecting that the operating system utilized by the computer apparatus is a second operating system, e.g., a Windows 7 operating system, via a general purpose input/output (GPIO) pin, the embedded controller 104 transmits a control signal C1 that controls the switching unit 106 to transmit the sensing data D1 to the platform controller hub 108 via the embedded controller 104. That is, the embedded controller 104 controls the switching unit 106 to transmit the sensing data D1 to the embedded controller 104, which then transmits the sensing data D1 to the platform controller hub 108. When the embedded controller 104 informs the sensor hub 102 not to perform transmission of the sensing data with another control signal, e.g., a GPIO signal, which can further disconnect power supplied to the sensor hub 102.

As such, by controlling the switching unit 106 to transmit the sensing data D1 selectively to the embedded controller 104 or the sensor hub 102 according to the operating system utilized by the computer apparatus, the platform controller hub 108 is enabled to receive the sensing data D1 under different operating system environments to further allow the computer apparatus to be functional.

Figure 2:
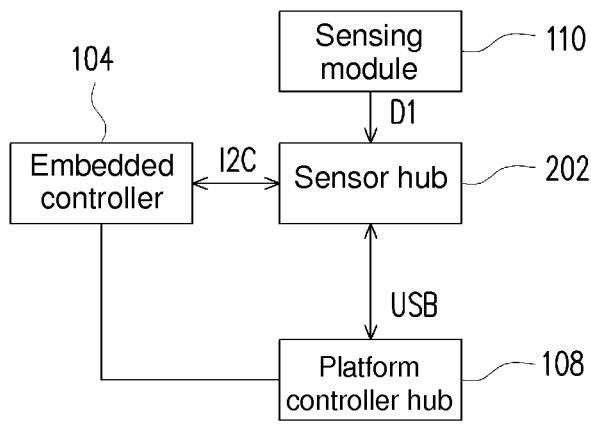
FIG. 2 is a schematic diagram of a computer apparatus according to another embodiment of the present invention.

FIG. 2 shows a schematic diagram of a computer apparatus according to another embodiment of the present invention. Referring to FIG. 2, a main difference of the computer apparatus of the embodiment from the computer apparatus in the embodiment in FIG. 1 is that, the computer apparatus of the embodiment does not include the switching unit 106, and a sensor hub 202 directly receives the sensing data D1 via, for example, an I2C bus. The sensor hub 202 has a first data transmission interface and a second data transmission interface. In the embodiment, according to the operating system utilized by the computer apparatus, the embedded controller 104 controls the sensor hub 202 to transmit the sensing data to the platform controller hub 108 via the first data transmission interface, or to transmit the sensing data to the platform controller hub 108 via the second data transmission interface and the embedded controller 104. For example, the first data transmission interface may be a USB bus, and the second data transmission interface may be an I2C bus.

Further, in the embodiment, the coupling of pins between the sensor hub 202, the embedded controller 104 and the platform controller hub 108 is also different from that in the embodiment in FIG. 1. In the embodiment in FIG. 1, pins (not shown) via which the sensor hub 202 outputs an I2C signal and a USB signal are connected to the platform controller hub 108. In the embodiment, a pin via which the sensor hub 202 outputs an I2C signal is connected to the embedded controller 104, and a pin via which the sensor hub 202 outputs a USB signal is still connected to the platform controller hub 108.

As such, upon detecting that the operating system category utilized by the computer apparatus is a Windows 8 operating system, the embedded controller 104 controls the sensor hub 202 to transmit the sensing data via a pin of the first data transmission interface (i.e., the USB bus) to the platform controller hub 108; when the operating system is a Windows 7 operating system, the embedded controller 104 controls the sensor hub 202 to first transmit the sensing data via a pin of the second data transmission interface (i.e., the I2C bus) to the embedded controller 104, which then transmits the sensing data to the platform controller hub 108, wherein the embedded controller 104 may send a control signal to a strap pin of the sensor hub 202 for example to control the sensor hub 202 to output the sensing data by an I2C pin or a USB pin.

As demonstrated by the above description, the embodiment also enables the platform controller hub 108 to receive the sensing data D1 under different operating systems to further allow the computer apparatus to be functional. Further, in the embodiment in FIG. 1, when the operating system utilized by the computer apparatus is a Windows 7 operating system, a power supplied to the sensor hub 102 is not required, whereas power needs to be continuously supplied to the sensor (e.g., an accelerometer, a gyroscope or a magnetometer) that performs sensing, such that a leakage current is possible between the switching unit 106 and the sensor hub 102. In the event that the leakage current flows to the platform controller hub 108 via the sensor hub 102, the computer apparatus may become malfunctioning. In the embodiment, as the switching unit 106 for switching the datapath is not required and the sensor hub 202 is consistently powered, the issue of leakage current as that in FIG. 1 is eliminated.

Figure 3:
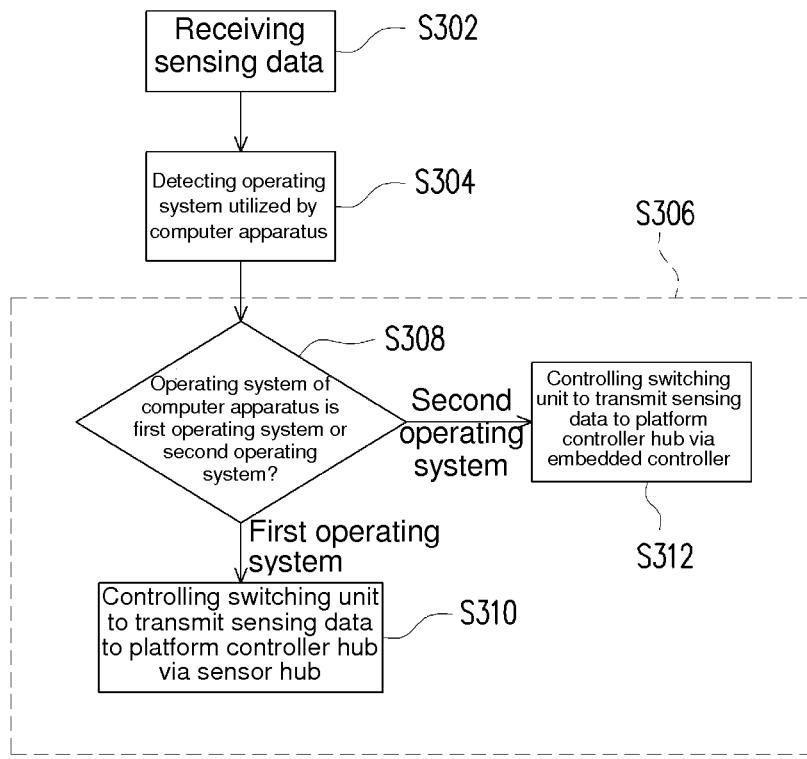
FIG. 3 is a datapath switching method for a computer apparatus according to an embodiment of the present invention.

FIG. 3 shows a datapath switching method according to an embodiment of the present invention. Referring to FIG. 3 and again referring to FIG. 1, the datapath switching method for the above computer apparatus includes the following steps. In step S302, sensing data is received and the received sensing data may be for example, at least one of accelerometer sensing data, gyroscope sensing data, and magnetometer sensing data. In step S304, an operating system utilized by the computer apparatus is detected and the detected operating system may be a second operating system, e.g., a Windows 7 operating system, or a first operating system, e.g., a Windows 8 operating system. In step S306, datapaths for transmitting the sensing data to the platform controller hub are switched according to the operating system utilized by the computer apparatus. For example, in step S306, a switching unit that receives the sensing data is controlled to transmit the sensing data to an embedded controller or a sensor hub according to the operating system utilized by the computer apparatus. For example, step S306 includes steps S308, S310 and S312. In step S308, for example, it is determined whether the operating system of the computer apparatus is the first operating system, e.g., a Windows 8 operating system, or the second operating system, e.g., a Windows 7 operating system. In step S310, when the operating system of the computer apparatus is a Windows 8 operating system, the switching unit is controlled to transmit the sensing data to the platform controller hub via the sensor hub. In contrast, in step S312, when the operating system of the computer apparatus is a Windows 7 operating system, the switching unit is controlled to transmit the sensing data to the platform controller hub via the embedded controller.

Figure 4:
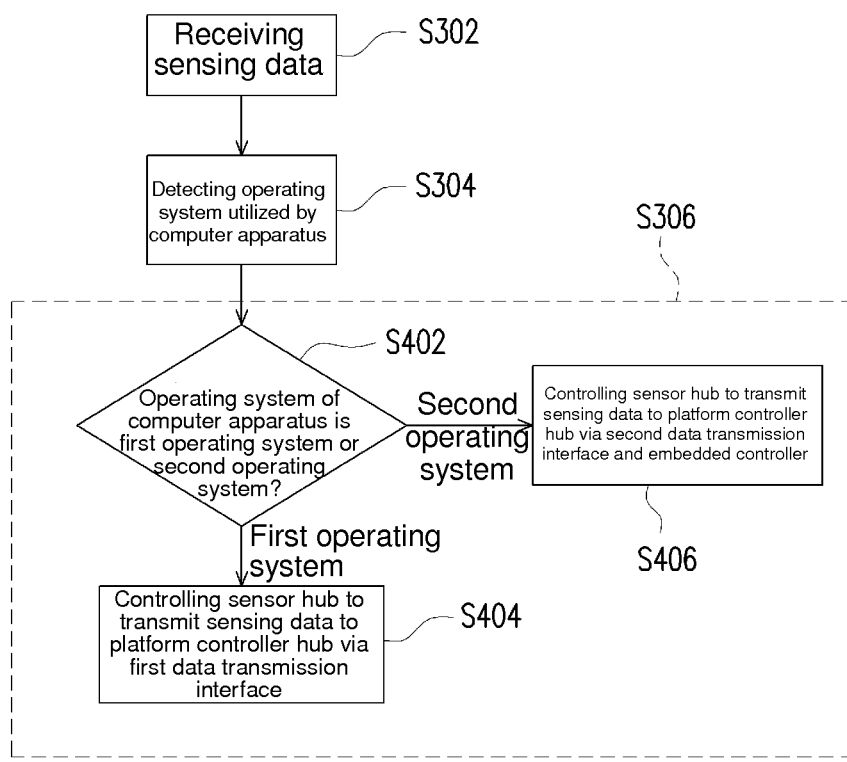
FIG. 4 is a datapath switching method for a computer apparatus according to another embodiment of the present invention.

FIG. 4 shows a datapath switching method for a computer apparatus according to another embodiment of the present invention. Referring to FIG. 4 and again referring to FIG. 2, a main difference of the datapath switching method for a computer apparatus of the embodiment from the embodiment in FIG. 3 is that, instead of using the switching unit, the datapath switching method of the embodiment controls and employs data transmission performed by a first data transmission path and a second data transmission path of the sensor hub to achieve the effect of step S306. In the embodiment, in step S306, for example, the sensor hub is controlled to transmit the sensing data to the platform controller hub via the first data transmission interface according to the operating system utilized by computer apparatus, or to transmit the sensing data to the platform controller hub via the second data transmission path and the embedded controller. For example, the first data transmission interface may be a USB bus, and the second data transmission interface may be an I2C bus.

More specifically, step S306 may include steps S402, S404 and S406. In step S402, it is determined whether the operating system of the computer apparatus is the first operating system, e.g., a Windows 8 operating system, or the second operating system, e.g., a Windows 7 operating system. In step S404, when the operating system of the computer apparatus is a Windows 8 operating system, the sensor hub is controlled to transmit the sensing data to the platform controller hub via the first data transmission interface. In step S406, when the operating system of the computer apparatus is a Windows 7 operating system, the sensor hub is controlled to transmit the sensing data to the platform controller hub via the second data transmission interface and the embedded controller.

In conclusion, in the present invention, through detecting an operating system utilized by a computer apparatus by an embedded controller and switching datapaths for transmitting sensing data according to the operating system utilized by the computer apparatus, the feasibility of applying a computer apparatus with both Windows 7 and Windows 8 operating systems is achieved.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A datapath switching apparatus, applied for switching paths for transmitting sensing data according to an operating system utilized by a computer apparatus, the datapath switching apparatus comprising:
   a sensor hub, coupled to a platform controller hub, configured to receive the sensing data; and
   an embedded controller, coupled to the platform controller hub, configured to detect the operating system utilized by the computer apparatus, and to switch datapaths for transmitting the sensing data to the platform controller hub according to the operating system utilized by the computer apparatus.

2. The datapath switching apparatus according to claim 1, wherein the embedded controller further controls the sensor hub to transmit the sensing data to the platform controller hub via a first data transmission interface, or to transmit the sensing data to the platform controller hub via a second data transmission interface and the embedded controller according to the operating system utilized by the computer apparatus.

3. The datapath switching apparatus according to claim 1, further comprising:
   a switching unit, coupled to the embedded controller and the sensor hub, configured to receive the sensing data, being controlled by the embedded controller to transmit the sensing data to the embedded controller or the sensor hub.

4. The datapath switching apparatus according to claim 1, wherein the sensing data comprises at least one of accelerometer sensing data, gyroscope sensing data, and magnetometer sensing data.

5. The datapath switching apparatus according to claim 2, wherein the first data transmission interface is a Universal Serial Bus (USB) bus, and the second data transmission interface is an Inter-Integrated Circuit (I2C) bus.

6. The datapath switching apparatus according to claim 2, wherein when an operating system of the computer apparatus is a Windows 8 operating system, the embedded controller controls the sensor hub to transmit the sensing data to the platform controller hub via the first data transmission interface; when the operating system of the computer apparatus is a Windows 7 operating system, the embedded controller controls the sensor hub to transmit the sensing data to the platform controller hub via the second data transmission interface and the embedded controller.

7. The datapath switching apparatus according to claim 3, wherein when an operating system of the computer apparatus is a Windows 8 operating system, the embedded controller controls the switching unit to transmit the sensing data to the platform controller hub via the sensor hub; when the operating system of the computer apparatus is a Windows 7 operating system, the embedded controller controls the switching unit to transmit the sensing data to the platform controller hub via the embedded controller.

8. A computer apparatus, configured with at least one operating system, the computer apparatus comprising:
   a platform controller hub;
   a sensing module, configured to generate sensing data;
   a sensor hub, coupled to the platform controller hub and the sensing module, configured to receive the sensing data; and
   an embedded controller, coupled to the platform controller hub, configured to detect an operating system utilized by the computer apparatus, and to switch datapaths for transmitting the sensing data to the platform controller hub according to the operating system utilized by the computer apparatus.

9. The computer apparatus according to claim 8, wherein the embedded controller further controls the sensor hub to transmit the sensing data to the platform controller hub via a first data transmission interface, or to transmit the sensing data to the platform controller hub via a second data transmission interface and the embedded controller according to the operating system utilized by the computer apparatus.

10. The computer apparatus according to claim 8, further comprising:
    a switching unit, coupled to the embedded controller and the sensor hub, configured to receive the sensing data, being controlled by the embedded controller to transmit the sensing data to the embedded controller or the sensor hub.

11. The computer apparatus according to claim 8, wherein the sensing data comprises at least one of accelerometer sensing data, gyroscope sensing data, and magnetometer sensing data.

12. The computer apparatus according to claim 9, wherein the first data transmission interface is a USB bus, and the second data transmission interface is an I2C bus.

13. The computer apparatus according to claim 9, wherein when an operating system of the computer apparatus is a Windows 8 operating system, the embedded controller controls the sensor hub to transmit the sensing data to the platform controller hub via the first data transmission interface; when the operating system of the computer apparatus is a Windows 7 operating system, the embedded controller controls the sensor hub to transmit the sensing data to the platform controller hub via the second data transmission interface and the embedded controller.

14. The computer apparatus according to claim 10, wherein when an operating system of the computer apparatus is a Windows 8 operating system, the embedded controller controls the switching unit to transmit the sensing data to the platform controller hub via the sensor hub; when the operating system of the computer apparatus is a Windows 7 operating system, the embedded controller controls the switching unit to transmit the sensing data to the platform controller hub via the embedded controller.

15. A datapath switching method, applied for switching datapaths for transmitting sensing data of a computer apparatus, the datapath switching method comprising:
    receiving the sensing data;
    detecting an operating system utilized by the computer apparatus; and
    switching the datapaths for transmitting the sensing data to the platform controller hub according to the operating system utilized by the computer apparatus.

16. The datapath switching method according to claim 15, wherein the step of switching the datapaths for transmitting the sensing data to the platform controller hub according to the operating system utilized by the computer apparatus comprises:

controlling a switching unit that receives the sensing data to transmit the sensing data to an embedded controller or a sensor hub according to the operating system utilized by the computer apparatus.

17. The datapath switching method according to claim 15, wherein the sensing data comprises at least one of accelerometer sensing data, gyroscope sensing data, and magnetometer sensing data.

18. The datapath switching method according to claim 16, wherein when an operating system of the computer apparatus is a Windows 8 operating system, the switching unit is controlled to transmit the sensing data to the platform controller hub via the sensor hub; when the operating system of the computer apparatus is a Windows 7 operating system, the switching unit is controlled to transmit the sensing data to the platform controller hub via the embedded controller.

19. The datapath switching method according to claim 15, wherein the step of switching the datapaths for transmitting the sensing data to the platform controller hub according to the operating system utilized by the computer apparatus comprises:

controlling a sensor hub to transmit the sensing data to the platform controller hub via a first data transmission interface, or to transmit the sensing data to the platform controller hub via a second data transmission interface and an embedded controller according to the operating system utilized by the computer apparatus.

20. The datapath switching method according to claim 19, wherein the first data transmission interface is a USB bus, and the second data transmission interface is an I2C bus.

21. The datapath switching method according to claim 19, wherein when an operating system of the computer apparatus is a Windows 8 operating system, the sensor hub is controlled to transmit the sensing data to the platform controller hub via the first data transmission interface; when the operating system of the computer apparatus is a Windows 7 operating system, the sensor hub is controlled to transmit the sensing data to the platform controller hub via the second data transmission interface and the embedded controller.

* * * * *